US012493766B2

(12) United States Patent
Huhtasalo

(10) Patent No.: US 12,493,766 B2
(45) Date of Patent: Dec. 9, 2025

(54) PRIVACY FOR RADIO-FREQUENCY IDENTIFICATION (RFID) TAG

(71) Applicant: Sensormatic Electronics, LLC, Boca Raton, FL (US)

(72) Inventor: Lauri Johannes Huhtasalo, Tampere (FI)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 18/789,102

(22) Filed: Jul. 30, 2024

(65) Prior Publication Data

US 2025/0045552 A1    Feb. 6, 2025

Related U.S. Application Data

(60) Provisional application No. 63/517,281, filed on Aug. 2, 2023.

(51) Int. Cl.
*G06K 19/06* (2006.01)
*G06F 16/955* (2019.01)
*G06K 19/07* (2006.01)

(52) U.S. Cl.
CPC ... *G06K 19/06037* (2013.01); *G06K 19/0712* (2013.01); *G06F 16/955* (2019.01)

(58) Field of Classification Search
CPC .......... G06K 19/06037; G06K 19/0712; G06F 16/955; G06F 16/9554

USPC ........................................................ 235/492
See application file for complete search history.

(56) References Cited

U.S. PATENT DOCUMENTS

2014/0214566 A1* 7/2014 High .................... G06Q 20/047
                                                          705/17
2017/0046707 A1* 2/2017 Krause .................... G07G 1/14

FOREIGN PATENT DOCUMENTS

| FR | 2717593 A1    | 9/1995 |
| FR | 3089660 A1    | 6/2020 |
| WO | 2022/058559 A1 | 3/2022 |

OTHER PUBLICATIONS

International Search Report and Written Opinion received for PCT Patent Application No. PCT/US2024/040345, mailed on Nov. 13, 2024, 12 pages.

* cited by examiner

*Primary Examiner* — Laura A Gudorf
(74) *Attorney, Agent, or Firm* — ArentFox Schiff LLP

(57) ABSTRACT

A bar code may be integrated with a product, and a management platform may be configured to: receive a query for the mode information of the RFID chip via the bar code, identify the RFID chip based on the bar code; and transmit an indication of a mode of the RFID chip. The bar code may include a two-dimensional code, a quick response (QR code), a three-dimensional code, and/or any graphical or visual machine-readable code.

20 Claims, 6 Drawing Sheets

PRIVACY FOR RADIO-FREQUENCY IDENTIFICATION (RFID) TAG

CROSS REFERENCE TO RELATED APPLICATION(S)

This application claims the benefit of U.S. Provisional Application Ser. No. 63/517,281, entitled "PRIVACY FOR RADIO-FREQUENCY IDENTIFICATION (RFID) TAG" and filed on Aug. 2, 2023, the disclosure of which is expressly incorporated by reference herein in its entirety.

BACKGROUND

Statement of the Technical Field

The present disclosure relates generally to security tags or labels including RFID chips associated with products. For example, the present disclosure relates to apparatuses and methods for providing consumer privacy in relation to RFID chips in labels/tags applied to products.

DESCRIPTION OF THE RELATED ART

Retailers and other commercial users have implemented RFID for improving their inventory accuracy and reducing out-of-stocks and increasing sales. Inventory accuracy enables various omnichannel delivery models. This implementation often happens after inventory management. Retailers may also use RFID tags for loss prevention to eliminate the need to have multiple tags (like radio frequency electronic article surveillance (RF EAS), acousto-magnetic (AM) EAS, and RFID) per merchandise.

Consumers may be hesitant to purchase items with embedded RFID security tags, however, due to the ability of the RFID to communicate with an RFID reader, sometimes even after a purchase. Thus, improvements in RFID tags and solutions are desired.

SUMMARY

The following presents a simplified summary of one or more aspects in order to provide a basic understanding of such aspects. This summary is not an extensive overview of all contemplated aspects, nor is it intended to identify key or critical elements of all aspects or delineate the scope of any or all aspects. Its sole purpose is to present some concepts of one or more aspects in a simplified form as a prelude to the more detailed description presented later.

In some aspects, the techniques described herein relate to a system for obtaining mode information of a radio frequency identification (RFID) chip integrated with a product, including: a bar code integrated with the product; and a management platform configured to: receive a query for the mode information of the RFID chip via the bar code; identify the RFID chip based on the bar code; and transmit an indication of a mode of the RFID chip.

In some aspects, the techniques described herein relate to a method for obtaining mode information of a radio frequency identification (RFID) chip integrated with a product, including: receiving a query for the mode information of the RFID chip via a bar code; identifying the RFID chip based on the bar code; and transmitting an indication of a mode of the RFID chip.

In some aspects, the techniques described herein relate to a non-transitory, computer-readable medium including computer executable code, the code when executed by one or more processors causes the one or more processors to, individually or in combination: receive, via a bar code, a query for mode information of a radio frequency identification (RFID) chip integrated with a product; identify the RFID chip based on the bar code; and transmit an indication of a mode of the RFID chip.

In some aspects, the techniques described herein relate to an apparatus for obtaining mode information of a radio frequency identification (RFID) chip integrated with a product, including: means for receiving a query for the mode information of the RFID chip via a bar code; means for identifying the RFID chip based on the bar code; and means for transmitting an indication of a mode of the RFID chip.

BRIEF DESCRIPTION OF THE DRAWINGS

The novel features believed to be characteristic of implementations of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further features and advances thereof, will be best understood by reference to the following detailed description of illustrative implementations of the disclosure when read in conjunction with the accompanying drawings, wherein:

DETAILED DESCRIPTION

Figure 1:
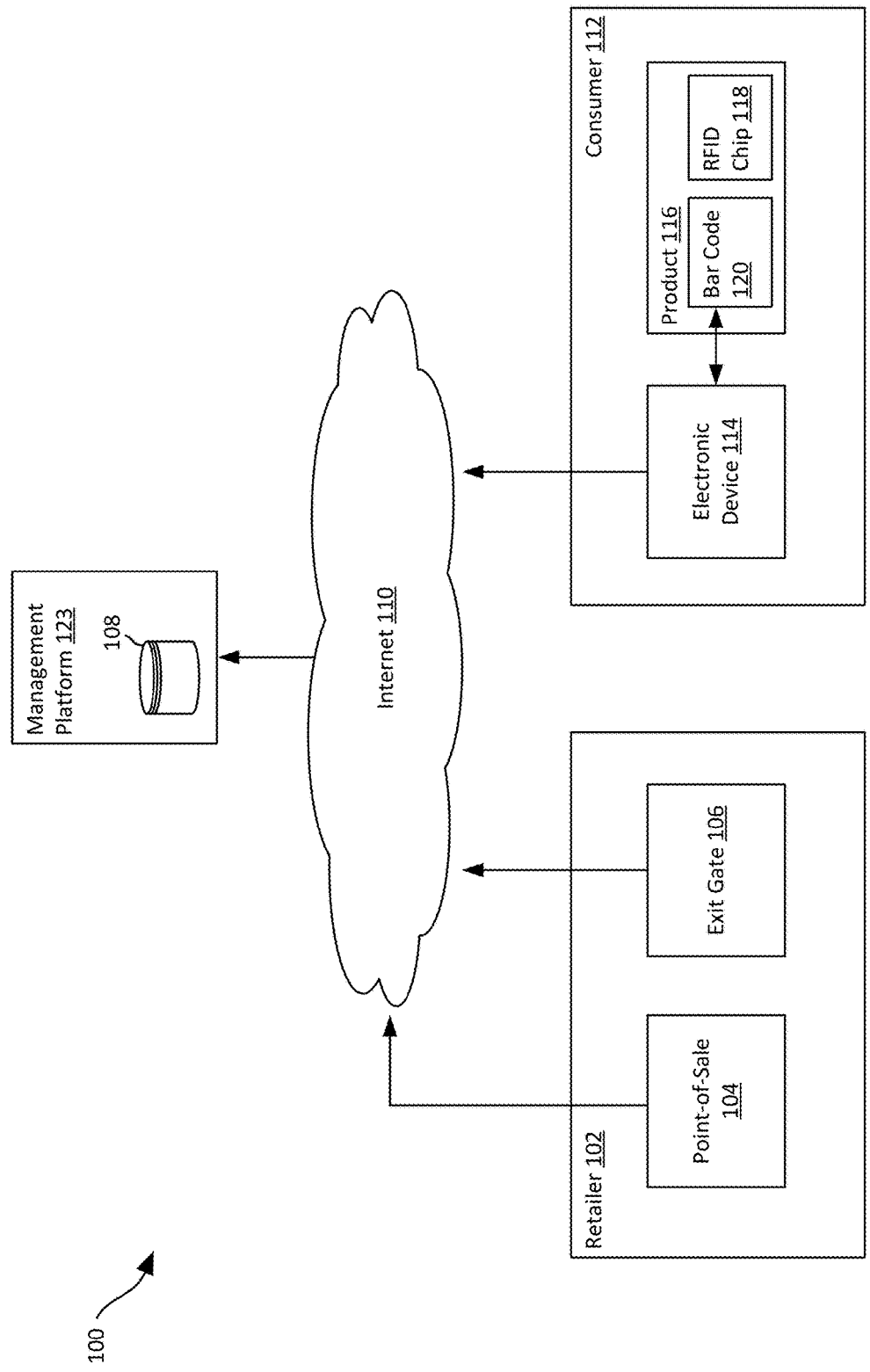
FIG. 1 is a block diagram conceptually illustrating an example network for disabling or otherwise reducing the effectivity of an RFID chip in a product.

It will be readily understood that the components of the aspects as generally described herein and illustrated in the appended figures could be arranged and designed in a wide variety of different configurations. Thus, the following more detailed description of various aspects, as represented in the figures, is not intended to limit the scope of the present disclosure but is merely representative of various aspects. While the various aspects of the aspects are presented in drawings, the drawings are not necessarily drawn to scale unless specifically indicated.

The present solution may be embodied in other specific forms without departing from its spirit or essential characteristics. The described aspects are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single aspect of the present solution. Rather, language referring to the features and advantages is understood to mean that a specific feature, advantage, or characteristic described in connection with an aspect is included in at least one aspect of the present solution. Thus, discussions of the features and advantages, and similar language, throughout the specification may, but do not necessarily, refer to the same aspect. As used in this document, "consumer" and "customer" may be used interchangeably.

Furthermore, the described features, advantages and characteristics of the present solution may be combined in any suitable manner in one or more aspects. One skilled in the relevant art will recognize, in light of the description herein, that the present solution can be practiced without one or more of the specific features or advantages of a particular aspect. In other instances, additional features and advantages may be recognized in certain aspects that may not be present in all aspects of the present solution.

Reference throughout this specification to "one aspect," "an aspect," or similar language means that a particular feature, structure, or characteristic described in connection with the indicated aspect is included in at least one aspect of the present solution. Thus, the phrases "in one aspect," "in an aspect," and similar language throughout this specification may, but do not necessarily, all refer to the same aspect.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As noted above, one obstacle for the wide-spread use of an RFID embedded security tag or label may relate to privacy concerns. For instance, an RFID transponder is a device which can be interrogated from the distance of tens of meters. If the RFID transponder is implemented in the form of an embedded RFID tag, it can be integrated permanently and discreetly to the garment. Therefore, it is natural if some consumers become concerned about their privacy. To handle such privacy issues, the RFID standards have evolved to include different measures to mitigate privacy concerns. One common way is to kill (deactivate permanently) the RFID device at a point of sale (POS). This is a good method, but it also means that the RFID functionality cannot be utilized for the use-cases after the POS (which would include for example returns management and circular economy applications such as Re-commerce and recycling). Another method would be to switch the RFID device into untraceable mode. In this mode, the read range of the RFID device is greatly reduced, (from meters or tens of meters to few centimeters). The consequence of use of the untraceable mode is that the device can then be interrogated with an RFID reader, but the product with the tag needs to be brought into very close proximity off the reader. This model supports many of the use-cases after the POS with slower, more manual operation but preventing high speed automated processing of the products or garments (such as on sorting conveyors of textile recycling facilities). Consumer may still be concerned, as the RFID device is in fact still functional, and the consumer does not have an easy way to detect if and how the device works. As used herein, a product may relate to an article, substance, or merchandise that is manufactured or refined for sale (e.g., a shirt, a digital camera, etc.).

The present disclosure enables a user, such as the consumer, a simple and efficient way to see the status of the RFID device integrated into their product or garment. For instance, the user can determine if the embedded RFID device is killed or switched to an untraceable or protected mode. Additionally, the present disclosure enables the user a simple and efficient way to command the embedded RFID device in their product or garment to be killed or switched to untraceable mode or protected mode, such as for a next time the embedded RFID device is interrogated by the reader of a retailer (e.g., the retailer that sold the garment).

FIG. 1 is a block diagram conceptually illustrating an example network 100 for disabling or otherwise reducing the effectivity of an RFID chip in a product 116, such as a security tag or label used in combination with an electronic article surveillance system. Here a consumer 112 may purchase a product 116 having a bar code 120 and an RFID chip 118 integrated or otherwise attached to the product 116. For example, the product 116 may be a garment having a sewn-in label or a label attached to the garment by a tag fastener. In this example, the label may include the bar code 120 and the RFID chip 118. In another example, the bar code 120 and RFID chip 118 may be on different tags or labels attached to the garment. The bar code 120 may be implemented as a two-dimensional code, a quick response (QR code), a three-dimensional code, and/or any graphical or visual machine-readable code.

The RFID chip 118 may be used to identify, track, and/or trace the product 116 or goods, in order to provide security, manage inventory, facilitate a sale or exchange, and/or improve supply chain efficiencies. Such tracking may be an automated process. For example, an RFID chip 118 may be automatically read by an RFID reader at a point-of-sale (POS) 104 and/or an exit gate 106 of a retailer 102 (e.g., storefront or warehouse) when the product 116 is positioned in a certain geographic location or is attached to an object that is moved. A reader may gather information about a product by transmitting an RF wave that is received by the RFID chip 118 via an RFID antenna coupled to the chip. The RF wave may be generated using any suitable standard, including GSI's electronic product code (EPC) air-interface protocol standards, EPCglobal ultra-high frequency (UHF) RFID protocol standards (e.g., Gen2v2, Gen2v3, etc.), and the like.

The chip, being powered by the received RF wave, may transmit back data (e.g., identification information associated with the product 116) to the reader. The reader may then transmit reader-collected data to a management platform 123 (e.g., a server and/or computing system of the retailer 102) to be stored in a database 108 via wired and/or wireless communication network (e.g., local area network (LAN), wireless local-area network (WLAN), Internet 110 connection, etc.). The data collected and stored may include information related to the product. The management platform 123 may be configured to track inventory based on identification information associated with the bar code 120 and RFID chip 118. In certain aspects, the management platform 123 may also be configured to store a status (e.g., active, disabled, reduced capability) of each RFID chip in the retailer's inventory.

However, once the product 116 is owned by the consumer 112, the consumer may wish to disable the RFID chip 118 for privacy concerns. For example, the consumer 112 may not want the RFID chip 118 to be interrogated and to provide information about the product 116 after the consumer 112 takes ownership. To handle such privacy issues, RFID standards have evolved to include different measures to mitigate privacy concerns. One measure is to kill (deactivate permanently) the RFID chip 118 at the POS 104 or exit gate 106. However, killing the RFID chip 118 may prevent RFID functionality for downstream product/inventory use-cases (e.g., returns management and recycling/circular economy applications). Another measure is to switch the RFID chip 118 into an untraceable mode. In this mode, the read range of the RFID device is greatly reduced, (e.g., from meters or tens of meters to a few centimeters). The consequence of this is that the device can still be interrogated with an RFID reader, but at a relatively shorter range. The untraceable mode may support many of the downstream use-cases after the product 116 passes the POS 104 or exit gate 106 with slower operation while preventing high speed automated processing of the products 116. Even with the untraceable mode, the consumer 112 may still have privacy concerns because the RFID chip 118 is still functional, and the consumer may not have the means to detect if the RFID chip 118 works (e.g., can be read by RFID reader) or the degree to which it still works.

In certain aspects, the management platform 123 may only return status of an RFID chip 118 for products which have been sold. For example, the retailer may limit access to the status of an RFID chip 118 for products that have been purchased. Here, the POS 104 of the retailer may update information corresponding to the product and stored at the management platform 123 once the product is purchased. The update may allow the management platform 123 to share (e.g., via a web page) RFID chip 118 information.

Accordingly, aspects of the disclosure are directed to providing the consumer 112 with the means to: (i) check the status of the RFID chip 118 to determine whether the chip is in a working mode or a killed/untraceable mode, and (ii) control the mode of the RFID chip 118 (e.g., command the RFID chip 118 to be put into a killed/untraceable mode the next time the RFID chip 118 is interrogated by an RFID reader).

This gives the consumer 112 a way to see the actual status of an RFID chip 118 integrated into the product 116. It also gives the consumer 112 a way to control the status of the RFID chip 118. A consumer's perception of how a retailer 102 views consumer privacy may be important for maintaining the consumer's trust. While the POS 104 and/or exit gate 106 of the retailer 102 may switch the RFID chip 118 to a killed/untraceable mode, providing the consumer 112 with the means to validate this may improve consumer trust.

As such, the bar code 120 may be integrated into the product (e.g., via a product label or tag) and may be configured to identify the product 116 using the same identifier information as the RFID chip 118. In one example, the consumer 112 may use an electronic device 114 (e.g., mobile phone, computer, or any other suitable electronic device) to read the bar code 120. By reading the bar code 120, the electronic device 114 may be connected to a web page associated with the bar code 120 and the identification information carried by the bar code 120 may be provided to the web page.

Figure 2:
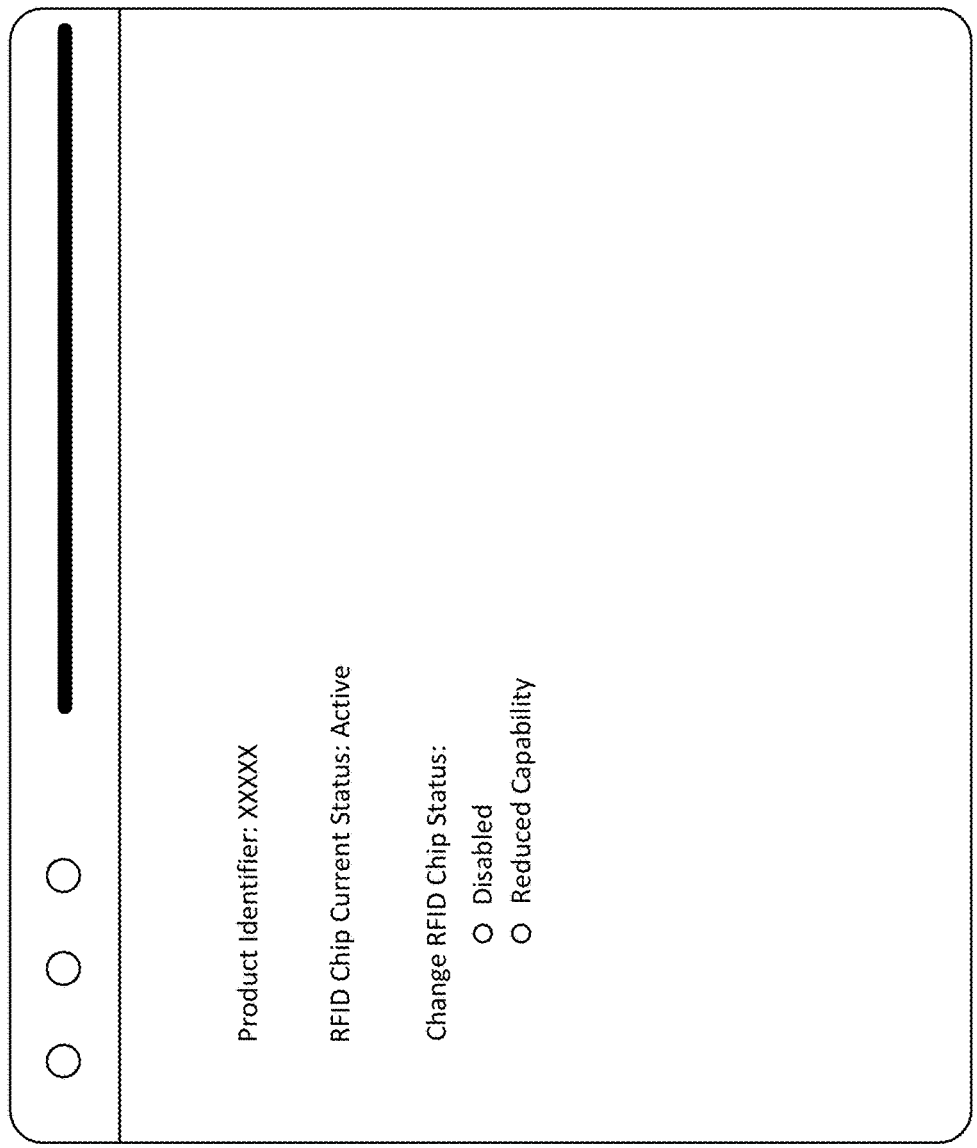
FIG. 2 is a block diagram illustrating an example of a web page and user interface that a consumer may use to change the mode of an RFID chip.

FIG. 2 is a block diagram illustrating an example of a web page 200 and user interface that a consumer may use to change the mode of an RFID chip 118. From the web page 200, the consumer 112 may see and change the current mode of the particular RFID chip 118 associated with the product 116. For example, the web page 200 may indicate that the current mode of the RFID chip 118 is "active" meaning that the RFID chip 118 can still be read by an RFID reader at maximum range. The web page 200 may also provide an indication of the product 116 based on the identification information provided by the bar code 120. The indication may include a picture of the product 116, a name of the product, and attributes of the product (e.g., size, color, material, serial number, etc.). The web page 200 may provide a user interface allowing the consumer 112 to select a new mode from the web page. For example, the consumer 112 may decide to disable (e.g., kill) the RFID chip 118, put the RFID chip into a protected mode, or put it into a reduced capability mode (e.g., untraceable mode, where the RFID chip 118 can only be read at short distances). Thus, the web page 200 may provide the consumer 112 with a means for changing a mode of a particular RFID chip 118 associated with the bar code 120 at the management platform 123. As such, the web page and/or the information presented on the web page may be hosted and/or managed by the management platform 123.

Referring back to FIG. 1, the web page 200 may pull information about the product 116 from the database 108, and the mode selected by the consumer 112 may update the product 116 information in the database 108 such that the mode of the RFID chip 118 is updated to the consumer's 112 selection the next time the consumer 112 passes through the POS 104 or exit gate 106. The consumer 112 may then confirm that the mode of the RFID chip 118 has changed by reading the bar code 120 with an electronic device 114 and checking the current status on the web page 200.

In certain aspects, the retailer 102 may configure the POS 104 so that the consumer 112 can use it to check the status of the RFID chip 118 and/or change the status of the RFID chip 118 at the retailer 102.

Figure 3:
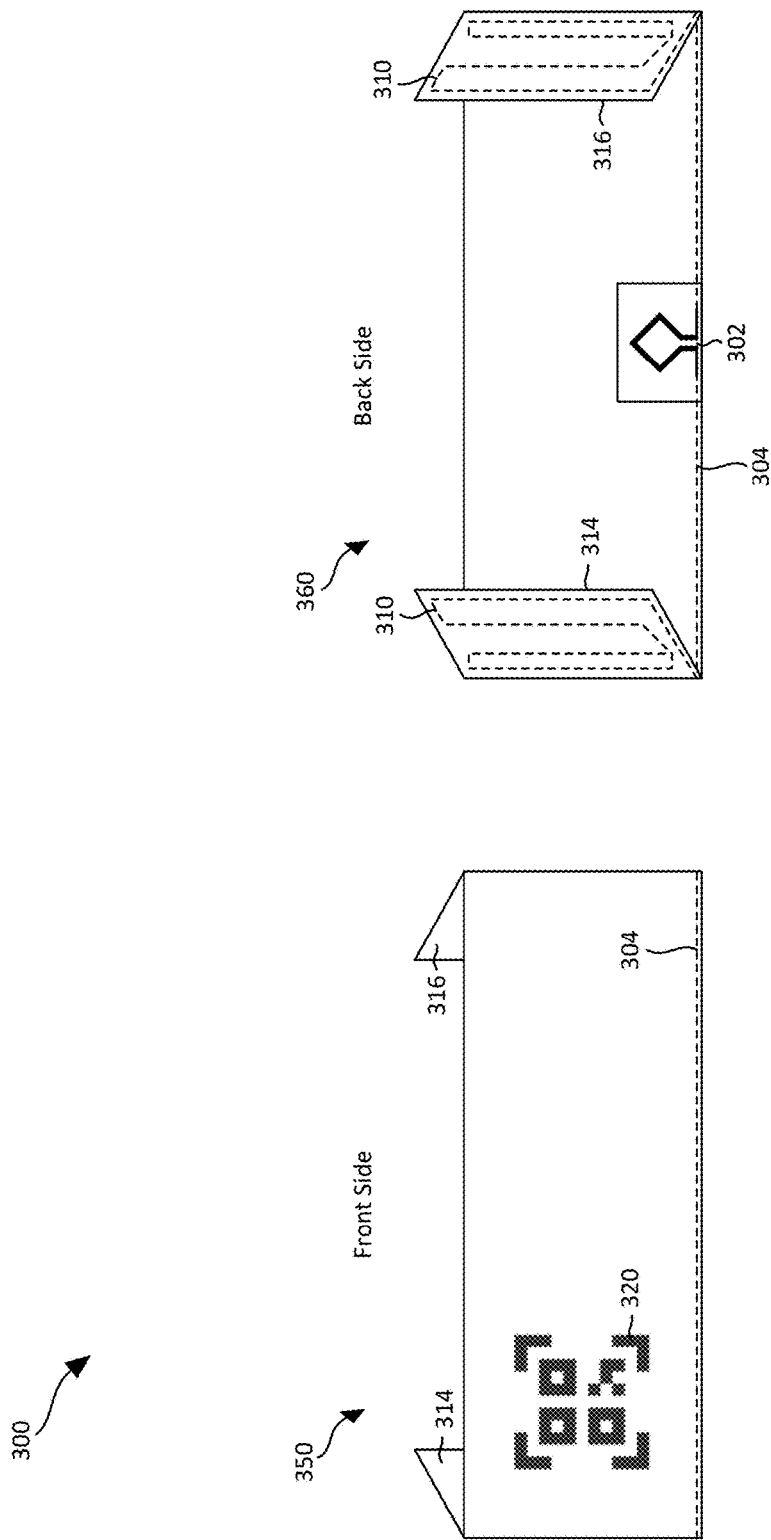
FIG. 3 is a block diagram illustrating an example front-side and back-side of a garment brand babel (or label).

FIG. 3 is a block diagram illustrating an example front-side 350 and back-side 360 of a garment brand babel (or label) 300. As illustrated, the front-side 350 of the label 300 includes a bar code (e.g., QR code 320), and the backside 360 of the label includes an RFID chip (or RFID loop) 302 inlay and one or more RFID antenna 310 coupled to the RFID chip 302 via an antenna wire 304. For example, the antenna 310, antenna wire 304, and RFID chip may be stitched and/or adhered to the label 300 using threading or any suitable adhesive medium. The antenna 310 may be formed into any suitable pattern including one having "wings" (or meandering) shape as illustrated. The antenna 310 may be located behind folded flaps (or folded ends) 314 and 316 of the label 300. Accordingly, the QR code 320 may be visible on the front-side 350 of the label, while the antenna 310, RFID chip 302, and antenna wire 304 may not be visible. It should be noted that although FIG. 3 illustrates a QR code 320, any two-dimensional code, three-dimensional code, and/or any graphical or visual machine-readable code may be used. Moreover, the RFID configuration (e.g., RFID chip 302, RFID antenna 310, and antenna wire 304) may take on the form of any suitable configuration (e.g., multiple antennae, varying antenna configurations and shapes, varying RFID chip configurations and shapes, etc.), and is not limited to the specific configuration illustrated in FIG. 3.

The RFID chip 302 may be encoded with an identifier configured to identify a garment or other product to which the label 300 is attached such that the identifier is readable by an external device such as an RFID reader. For example, the identifier may include a tag identifier (TID), a key identifier (KID), a unique item identifier (UII), an electronic product code (EPC), garment stock keeping unit (SKU), a serialized trade identification number (SGTIN), and/or any other suitable identifier or identification code. Accordingly, using an RFID reader (not shown), a wireless connection between the RFID chip 302 and the RFID reader may be formed. The RFID reader may retrieve information stored in the RFID chip and further provide the obtained information to a computer database, as discussed above. The obtained information can further be verified/analyzed and stored by the computer database. Thus, the label 300 may be used for: (i) inventory management and loss prevention, and (ii) self-checkout and mobile checkout.

In certain aspects, the front-side 350 of the label 300 may include static information such as a brand name, product name, logo, size manufacturing country, and the QR code 320. The QR code 320 may be associated with the same identifier information stored in the RFID chip 302. For example, a particular QR code may be linked to a particular product via any one or more of the identifiers discussed above. The QR code 320 may also be configured to cause a consumer electronic device (e.g., a cell phone) to open a particular web page (e.g., web page 200 of FIG. 2) via a hyperlink.

It should be noted that in certain aspects, the bar code (e.g., QR code 320) and/or the RFID configuration (e.g., RFID chip 302, RFID antenna 310, and antenna wire 304) may be located on separate tags or on different portions of the garment. For example, the RFID tag may be located within an overlock seam, a collar, or other similar portion of the garment that is hidden from plain view. The bar code may be located in the brand label, a garment-care label, or any other suitable location visible to an individual. Accordingly, the RFID configuration may not necessarily be visible to the individual, whereas the bar code may be visible and easily accessible to the individual.

Figure 4:
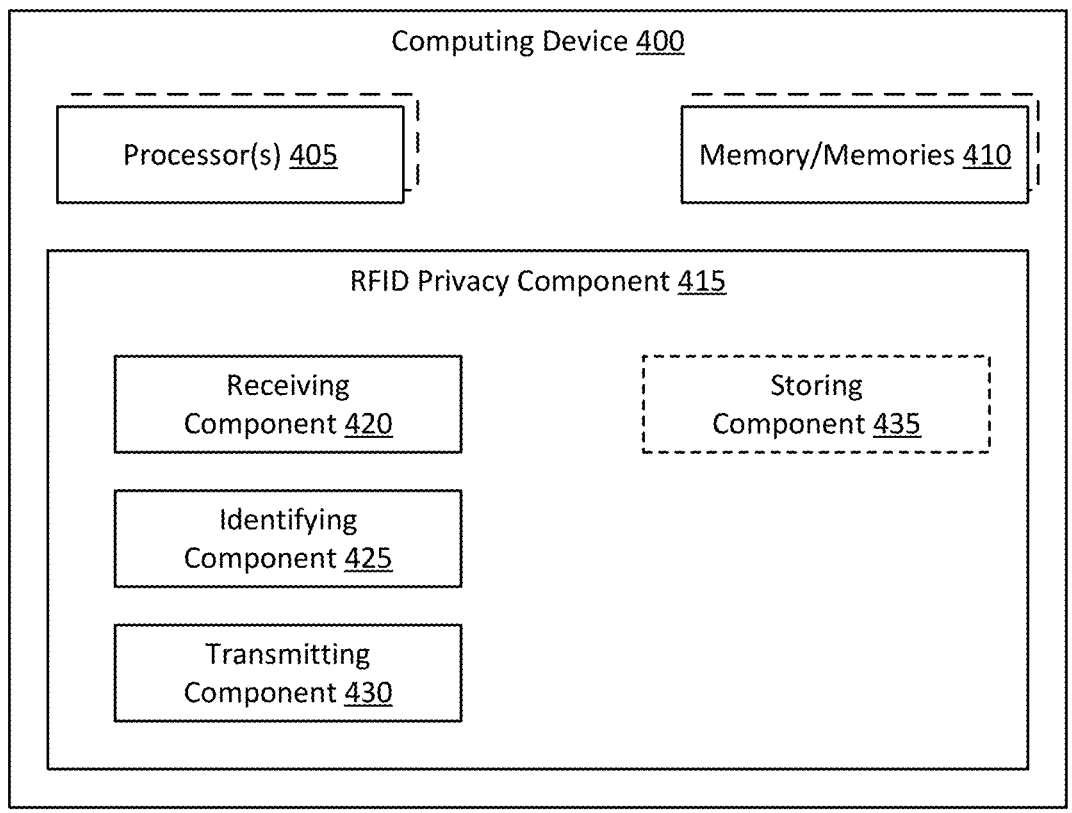
FIG. 4 is a block diagram conceptually illustrating an example of a hardware implementation for a management platform according to some aspects of the disclosure.
Figure 5:
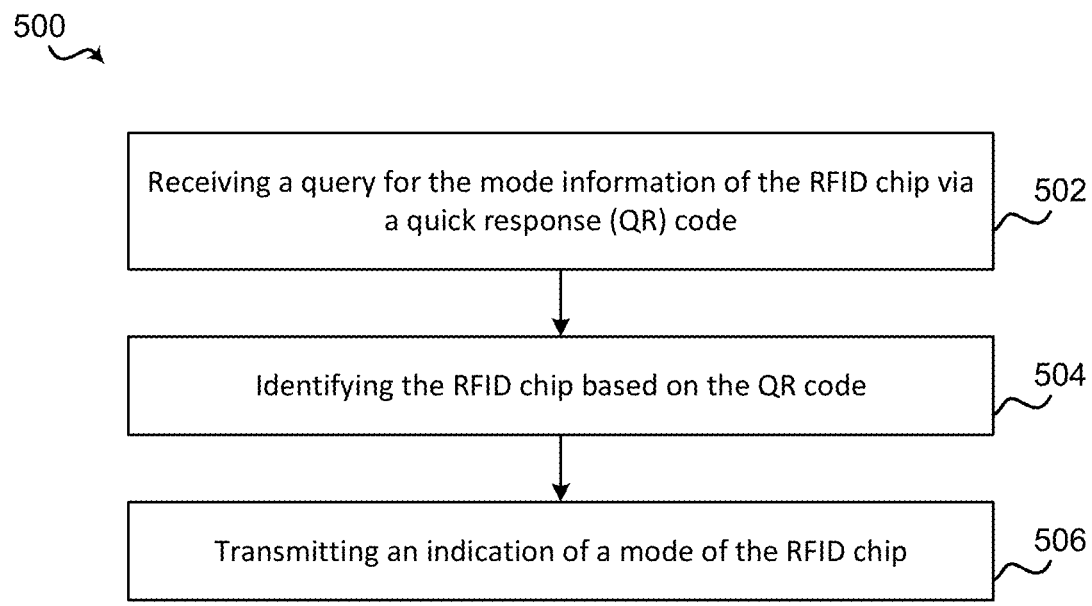
FIG. 5 is a flow chart illustrating an exemplary process for modifying an RFID chip mode according to some aspects of the disclosure.

Referring to FIG. 4 and FIG. 5, in operation, computer device 400 (e.g., management platform 123 of FIG. 1) may perform a method 500 for obtaining mode information of a radio frequency identification (RFID) chip integrated with a product, such as via execution of RFID privacy component 415 by one or more processors 405 configured, individually or in any combination, to execute instructions to perform the following actions, and/or configured to communicate with one or more memories 410 to obtain the instructions.

At block 502, the method 500 includes receiving a query for the mode information of the RFID chip via a bar code. For example, in an aspect, computer device 400, one or more processors 405, one or more memories 410, RFID privacy component 415, and/or receiving component 420 may be configured to or may comprise means for receiving a query for the mode information of the RFID chip via a bar code.

For example, the receiving at block 502 may include a management platform configured to receive a request for mode information associated with a bar-code. In some examples, the request may be generated by a bar code reader functional to capture and/or read a bar code. Here, a customer may use an electronic device (e.g., a mobile user equipment such as a tablet, cell phone, etc.) to read the bar code and perform a function associated with the bar code. For example, the bar code may cause the customer's device to open a web page (e.g., web page 200 of FIG. 2) via a hyperlink associated with the bar code. In some examples, the request may include information about the bar code that the management platform may use to identify the corresponding RFID chip. The request may cause the management platform to populate the web page with current mode information for a corresponding RFID chip.

As such, the customer may use the bar code to gain control over a mode associated with the RFID chip that is integrated with the customer's product. Here, the customer may buy a product with an RFID chip integrated into the product (e.g., as illustrated in FIG. 3). To improve customer privacy and prevent a retailer or other store from being able to read the RFID chip after purchase, the customer may change the RFID chip mode to disable or reduce its functionality with respect to RFID readers.

At block 504, the method 500 includes identifying the RFID chip based on the bar code. For example, in an aspect, computer device 400, one or more processors 405, one or more memories 410, RFID privacy component 415, and/or identifying component 425 may be configured to or may comprise means for identifying the RFID chip based on the bar code.

For example, the identifying at block 504 may include the management platform functional to associate bar code information associated with a received request with a particular RFID chip. For example, the bar code reader to transmit a request (e.g., via a wired or wireless connection) that includes information about the read bar code to the management platform. The management platform may use a look-up table or any suitable mechanism to determine which RFID chip is integrated with the product having the read bar code.

Further, for example, the identifying at block 504 may be performed to identify the RFID chip so that the customer may observe a current mode of operation of the RFID chip associated with the customers product and change or modify the mode of operation. This allows the customer to make changes to the RFID chip functionality for the customer's product. It also provides the customer with a chance to observe the change/modification.

At block 506, the method 500 includes transmitting an indication of a mode of the RFID chip. For example, in an aspect, computer device 400, one or more processors 405, one or more memories 410, RFID privacy component 415, and/or transmitting component 430 may be configured to or may comprise means for transmitting an indication of a mode of the RFID chip.

For example, the transmitting at block 506 may include a management platform configured to identify the RFID chip associated with a customer's product and read a current mode of operation used by the RFID chip. In some examples, the bar code information received by the management platform may cause the platform to identify the RFID chip associated with the bar code information and the current mode of operation associated with the bar code information. The management platform may use a database (e.g., database 108 of FIG. 1) to store a look-up table configured to identify the RFID chip associated with the received bar code information and identify a current mode of operation associated with the RFID chip.

Further, for example, the transmitting at block 506 may be performed to provide the customer with an indication of a current mode of operation of the RFID chip associated with the customer's product. Here, once the management platform has determined the current mode of operation of the RFID chip, it may transmit an indication of the mode to the customer via any suitable electronic interface (e.g., display the current mode on a web page, send a text or email, etc.). RFID chip modes may include "active" (e.g., an RFID chip that can be read by an RFID reader under normal conditions), "disabled" (e.g., a deactivated RFID chip that cannot be read by an RFID reader (e.g., the RFID chip is killed)), "protected" (e.g., an RFID chip that cannot be read or can only be partially read by an RFID reader unless the chip receives a unique command sequence from the RFID reader.

Here, the RFID chip may be nonresponsive to standard UHF tag command sequences but may transmit data back to the reader in response to a particular command sequence), or "reduced capability" (e.g., a semi-deactivated RFID chip that cannot be read under normal conditions but may still be read by a reader in close/immediate proximity to the RFID chip). The customer may change the mode of the RFID chip according to the customer's preference via the electronic interface. In an example of the protected mode, the RFID chip may be "invisible" to RFID readers (e.g., the RFID chip does not transmit back any data, or only transmits back a reduced amount of data) in response to an RFID reader RF wave interrogation. However, an RFID chip in a protected mode may return to an active mode if it is interrogated by an RF wave having a unique command sequence configured to active the chip.

Accordingly, the mode of the RFID chip comprises one of an active mode, a disabled mode, a protected mode, or a reduced capability mode. When a user changes the mode of the RFID chip, the electronic media used by the customer (e.g., web page, text/email, etc.) may transmit an indication of the change to the management platform, and the management platform may update the database to reflect the change of mode. If the customer passes or uses an RFID reader associated with a particular retailer that employs the management platform, the reader may transmit an indication of the RFID chip to the management platform, and the management platform may command the reader to change/modify the chip mode according to the customer's preference.

In an alternative or additional aspect, the bar code is configured to cause an electronic device to open a URL configured to present information about the RFID chip.

In an alternative or additional aspect, the bar code is configured to provide an indication of an identifier associated with the product. In this aspect, the identifier associated with the product is also associated with the RFID chip.

In an alternative or additional aspect, the bar code is imprinted on a label of the product.

Figure 6:
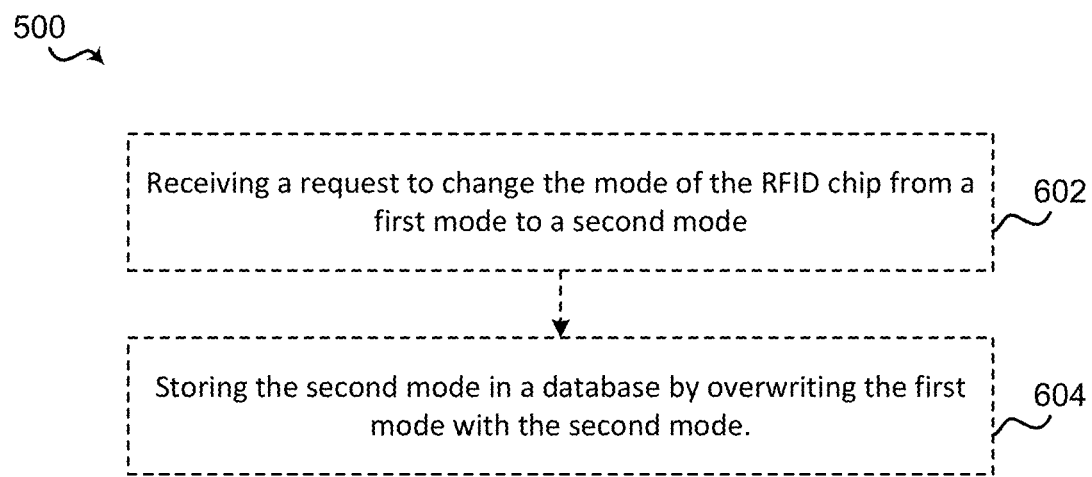
FIG. 6 is another flow chart illustrating additional exemplary processes for modifying an RFID chip mode.

Referring to FIG. 6, in an alternative or additional aspect, at block 602, the method 500 may further include receiving a request to change the mode of the RFID chip from a first mode to a second mode. For example, in an aspect, computer device 400, one or more processors 405, one or more memories 410, RFID privacy component 415, and/or receiving component 420 may be configured to or may comprise means for receiving a request to change the mode of the RFID chip from a first mode to a second mode.

For example, the receiving at block 602 may include a management platform configured to receive a request, from a customer, to change a mode associated with an RFID chip integrated with the customer's product. The request may be transmitted to the management platform via any suitable electronic interface (e.g., web page, email, text, etc.).

Further, for example, the receiving at block 602 may be performed to allow the customer to change the functionality of an RFID chip associated with the customer's product.

In this optional aspect, at block 604, the method 500 may further include storing the second mode in a database by overwriting the first mode with the second mode. For example, in an aspect, computer device 400, one or more processors 405, one or more memories 410, RFID privacy component 415, and/or storing component 435 may be configured to or may comprise means for storing the second mode in a database by overwriting the first mode with the second mode.

For example, the storing at block 604 may include a database (e.g., database 108 of FIG. 1). Here, the database may store a current mode associated with a particular RFID chip. The customer may change the current mode to reflect the customer's preference. Accordingly, the management platform may update the current mode stored in the database to reflect the customer's preference.

Further, for example, the storing at block 604 may be performed so that the next time the customer uses or passes by an RFID reader used by a retailer that employs the management platform, the RFID reader can change the RFID chip functionality to reflect the customer's preference.

ADDITIONAL CONSIDERATIONS

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above-described aspects. Rather, the scope of the present solution should be defined in accordance with the following claims and their equivalents.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored there-on a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for per-forming X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Example Aspects

Clause 1. A system for obtaining mode information of a radio frequency identification (RFID) chip integrated with a product, comprising: a bar code integrated with the product; and a management platform configured to: receive a query for the mode information of the RFID chip via the bar code; identify the RFID chip based on the bar code; and transmit an indication of a mode of the RFID chip.

Clause 2. The system of clause 1, wherein the mode of the RFID chip comprises one of an active mode, a disabled mode, a protected mode, or a reduced capability mode.

Clause 3. The system of any of clauses 1 and 2, wherein the bar code is configured to cause an electronic device to open a URL containing information hosted by the management platform.

Clause 4. The system of any of clauses 1-3, wherein the bar code is configured to provide an indication of an identifier associated with the product.

Clause 5. The system of clause 4, wherein the identifier associated with the product is also associated with the RFID chip.

Clause 6. The system of any of clauses 1-5, wherein the mode of the RFID chip is stored on the management platform and associated with the bar code.

Clause 7. The system of any of clauses 1-6, wherein the management platform is further configured to: receive a request to change the mode of the RFID chip from a first mode to a second mode; and store the second mode in a database by overwriting the first mode with the second mode.

Clause 8. The system of clause 7, further comprising an RFID reader configured to: receive, from the RFID chip, an indication of an identifier associated with the product in response to an interrogation; transmit the identifier associated with the product to the management platform; receive an indication of the second mode from the management platform; and set the mode of the RFID chip to the second mode.

Clause 9. The system of clause 8, wherein the RFID reader is implemented as a point-of-sale or an exit gate.

Clause 10. The system of any of clauses 8 and 9, wherein the RFID reader is configured to communicate with the management platform via a communication network.

Clause 11. The system of any of clauses 1-10, wherein the management platform comprises a database configured to store a plurality of RFID chips and product information corresponding to each of the plurality of RFID chips.

Clause 12. The system of clause 11, wherein each of the plurality of RFID chips are stored according to an identifier linking each RFID chip with a bar code.

Clause 13. The system of any of clauses 1-12, wherein the bar code is imprinted on a label of the product.

Clause 14. A method for obtaining mode information of a radio frequency identification (RFID) chip integrated with a product, comprising: receiving a query for the mode information of the RFID chip via a bar code; identifying the RFID chip based on the bar code; and transmitting an indication of a mode of the RFID chip.

Clause 15. The method of clause 14, wherein the mode of the RFID chip comprises one of an active mode, a disabled mode, a protected mode, or a reduced capability mode.

Clause 16. The method of any of clauses 14 and 15, wherein the bar code is configured to cause an electronic device to open a URL configured to present information about the RFID chip.

Clause 17. The method of any of clauses 14-16, wherein the bar code is configured to provide an indication of an identifier associated with the product.

Clause 18. The method of clause 17, wherein the identifier associated with the product is also associated with the RFID chip.

Clause 19. The method of any of clauses 14-18, wherein the bar code is imprinted on a label of the product.

Clause 20. A non-transitory, computer-readable medium comprising computer executable code, the code when executed by one or more processors causes the one or more processors to, individually or in combination perform the method of clauses 1-13.

Clause 21. An apparatus comprising one or more means for performing the method of any of clauses 1-13.

What is claimed is:

1. A system for obtaining mode information of a radio frequency identification (RFID) chip integrated with a product, comprising:
   a bar code integrated with the product; and
   a management platform configured to:
      receive, from a user device, a query for the mode information of the RFID chip via the bar code;
      identify the RFID chip based on the bar code; and
      transmit, to the user device in response to the query, display information associated with a visual indication of a mode of the RFID chip.

2. The system of claim 1, wherein the mode information comprises an active mode, a disabled mode, a protected mode, and a reduced capability mode, and wherein the mode of the RFID chip is one of the active mode, the disabled mode, the protected mode, or the reduced capability mode.

3. The system of claim 1, wherein the bar code is configured to cause an electronic device to open a URL containing information hosted by the management platform.

4. The system of claim 1, wherein the bar code is configured to provide an indication of an identifier associated with the product.

5. The system of claim 4, wherein the identifier associated with the product is also associated with the RFID chip.

6. The system of claim 1, wherein the mode of the RFID chip is stored on the management platform and associated with the bar code.

7. The system of claim 1, wherein the management platform is further configured to:
   receive a request to change the mode of the RFID chip from a first mode to a second mode; and
   store the second mode in a database by overwriting the first mode with the second mode.

8. The system of claim 7, further comprising an RFID reader configured to:
   receive, from the RFID chip, an indication of an identifier associated with the product in response to an interrogation;
   transmit the identifier associated with the product to the management platform;
   receive an indication of the second mode from the management platform; and
   set the mode of the RFID chip to the second mode.

9. The system of claim 8, wherein the RFID reader is implemented as a point-of-sale or an exit gate.

10. The system of claim 8, wherein the RFID reader is configured to communicate with the management platform via a communication network.

11. The system of claim 1, wherein the management platform comprises a database configured to store a plurality of RFID chips and product information corresponding to each of the plurality of RFID chips.

12. The system of claim 11, wherein each of the plurality of RFID chips are stored according to an identifier linking each RFID chip with a bar code.

13. The system of claim 1, wherein the bar code is imprinted on a label of the product.

14. A method for obtaining mode information of a radio frequency identification (RFID) chip integrated with a product, comprising:
   receiving, from a user device, a query for the mode information of the RFID chip via a bar code;
   identifying the RFID chip based on the bar code; and
   transmitting, to the user device in response to the query, display information associated with a visual indication of a mode of the RFID chip.

15. The method of claim 14, wherein the mode information comprises an active mode, a disabled mode, a protected mode, and a reduced capability mode, and wherein the mode of the RFID chip is one of the active mode, the disabled mode, the protected mode, or the reduced capability mode.

16. The method of claim 14, wherein the bar code is configured to cause an electronic device to open a URL configured to present information about the RFID chip.

17. The method of claim 14, wherein the bar code is configured to provide an indication of an identifier associated with the product.

18. The method of claim 17, wherein the identifier associated with the product is also associated with the RFID chip.

19. The method of claim 14, wherein the bar code is imprinted on a label of the product.

20. A non-transitory, computer-readable medium comprising computer executable code, the code when executed by one or more processors causes the one or more processors to, individually or in combination:
   receive, from a user device and via a bar code, a query for mode information of a radio frequency identification (RFID) chip integrated with a product;
   identify the RFID chip based on the bar code; and
   transmit, to the user device in response to the query, display information associated with a visual indication of a mode of the RFID chip.

* * * * *